US008054462B2

United States Patent
Chyba et al.

(10) Patent No.: US 8,054,462 B2
(45) Date of Patent: Nov. 8, 2011

(54) QUANTUM EFFICIENCY ENHANCEMENT DEVICE FOR ARRAY DETECTORS

(75) Inventors: Thomas H. Chyba, Tijeras, NM (US); Thomas Stewart McKechnie, Albuquerque, NM (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 12/638,231

(22) Filed: Dec. 15, 2009

(65) Prior Publication Data

US 2011/0063611 A1  Mar. 17, 2011

Related U.S. Application Data

(60) Provisional application No. 61/242,933, filed on Sep. 16, 2009.

(51) Int. Cl.
*G01J 3/44* (2006.01)
(52) U.S. Cl. ........................................ 356/301
(58) Field of Classification Search .......... 356/301, 356/326–328
See application file for complete search history.

(56) References Cited

U.S. PATENT DOCUMENTS

| | | | | |
|---|---|---|---|---|
| 5,644,396 | A * | 7/1997 | Hopkins, II | 356/301 |
| 5,995,251 | A * | 11/1999 | Hesselink et al. | 359/30 |
| 6,608,677 | B1 * | 8/2003 | Ray et al. | 356/301 |
| 6,687,000 | B1 * | 2/2004 | White | 356/328 |
| 6,788,407 | B1 * | 9/2004 | Higdon et al. | 356/301 |
| 7,605,917 | B2 * | 10/2009 | Teichmann et al. | 356/326 |
| 2006/0007531 | A1 | 1/2006 | Korengut et al. | |
| 2006/0192093 | A1 * | 8/2006 | Kok et al. | 250/234 |
| 2008/0198365 | A1 * | 8/2008 | Treado et al. | 356/301 |
| 2010/0277723 | A1 * | 11/2010 | Rezac et al. | 356/301 |

OTHER PUBLICATIONS

Polishchuk, et al., "Correction of the Image Tilt in Optical Systems", J. Opt. Technol. vol. 75, No. 7, Jul. 2008, pp. 432-436.
Barth, et al., "Stigmatic and Coma-Free Imaging with a Thick Prism: A Comparison of Third-Order Theory and Ray-Tracing Results", Applied Optics, vol. 27, No. 18, Sep. 1988, pp. 3838-3844.
Gunter et al., "Optical Devices to Increase Photocathode Quantum Efficiency", Applied Optics, vol. 9, No. 2, Feb. 1970, pp. 251-257.
Livingston, "Enhancement of Photocathode Sensitivity by Total Internal Reflection as Applied to an Image Tube", Applied Optics, vol. 5, No. 8, Aug. 1966, pp. 1335-1336.
Hirschfeld, "Modifications in Photomultipliers with Total Internal Reflection Enhanced Sensitivity", Applied Optics, vol. 5, No. 8, Aug. 1966, pp. 1337-1338.

(Continued)

*Primary Examiner* — Kara E Geisel
(74) *Attorney, Agent, or Firm* — Edell, Shapiro & Finnan, LLC

(57) ABSTRACT

Systems and methods for increasing the quantum efficiency of a photocathode used in an intensified an intensified array detector with a photocathode, such as a charge-coupled device (ICCD) are presented. A quantum efficiency enhancement device is disposed in front of an ICCD and is configured to enable or facilitate an increase in the angle of incidence of incoming rays incident on the photocathode. The ICCD itself may be tilted to achieve an increased angle of incidence, and such tilting is preferably only in a direction in which pixel columns of the ICCD extend such that a plane of incidence of incoming light to the ICCD is perpendicular to a direction of wavelength dispersion. The quantum efficiency enhancement device may include re-imaging optics, an optical tilt compensator and optical coupler.

4 Claims, 12 Drawing Sheets

OTHER PUBLICATIONS

Carter et al., "Standoff Detection of High Explosive Materials at 50 Meters in Amvient Light Conditions Using a Small Raman Instrument", Applied Spectroscopy, vol. 59, No. 6, 2005, pp. 769-775.

European Search Report, EP10176321, Feb. 1, 2011, 9 pages.

* cited by examiner

QUANTUM EFFICIENCY ENHANCEMENT DEVICE FOR ARRAY DETECTORS

This application claims the benefit of U.S. Provisional Application No. 61/242,933, filed Sep. 16, 2009, the entirety of which is incorporated herein by reference.

FIELD OF THE INVENTION

Embodiments of the present invention relate to intensified and non-intensified array detectors, such as charge-coupled devices. More particularly, embodiments of the present invention relate to increasing the quantum efficiency of a photocathode within an intensified array detector, including intensified charge-coupled device (ICCD) and cameras.

BACKGROUND OF THE INVENTION

The danger of exposure to chemical or biological agents can be severe. Whether a result of unintended release by way of, e.g., an accident, or a result of intentional delivery, it is desirable to quickly and accurately identify (1) the type of agent that has been released and (2) the precise area of contamination. Early and accurate detection of such dangerous substances can be a significant factor in reducing potential casualties and limiting further spreading of the agent by, e.g., wind, human or animal contact, among other transmission mechanisms.

In recent years, there has been an increased interest in developing and deploying sensor technologies to quickly identify unknown substances, contaminants, and agents, even at very low concentrations. Some of these technologies are designed to measure surface-deposited contamination using vehicles and associated test equipment to retrieve a physical sample of the contaminant and then employ extremely cumbersome and time-consuming processes based on a mechanical sampling wheel system to test for agents.

In view of the complexity of such approaches, newer, safer and more reliable technologies have emerged. One such technology is referred to, generally, as "standoff surface detection," and refers to a category of technologies that permit detection of substances without actually having to physically come in contact with the substance or agent of concern. The goal of these detection systems is to enable the capability to detect, identify, locate, quantify, warn, and report chemical or biological threats and thereby give military forces or civilian personnel sufficient early warning to avoid (further) contamination.

An example of a standoff surface detection system is a technology known as Laser Interrogation of Surface Agents (LISA®) that has been developed by ITT Corp. (White Plains, N.Y.). In one implementation, LISA® uses a laser and associated components attached to a reconnaissance vehicle such as a truck or High Mobility Multipurpose Wheeled Vehicle (HMMWV) that searches for chemical agents on the ground (or any surface) using a technique known as Raman Scattering (or Raman Effect, or Raman spectroscopy), which is an optical property that can be exploited to identify chemical and biological agents. LISA® employs several components including an intensified charge coupled device (ICCD) for capturing Raman spectra. LISA® also provides the ability to create or generate a position detection map with inputs from, e.g., a global positioning satellite (GPS) system, with chemical agent contours that build up as detection is taking place.

Standoff biological agent detection is significantly more difficult than chemical detection. Specifically, it is often difficult to discriminate and measure biological agents from naturally occurring background materials. Moreover, real-time detection and measurement of biological agents in the environment can be daunting because of the number of potential agents to be identified, the complex nature of the agents themselves, the countless number of similar microorganisms that are a constant presence in the environment, and the minute quantities of pathogen that can initiate harmful reactions. Potential biological agents can also disguise themselves in benign entities.

In light of these and other obstacles and in furtherance of more accurate contaminant or, more generally, unknown substance, detection and identification capabilities, there is still a need for improvements in stand-off detection systems, as well as other systems that might rely on sophisticated spectral analysis, such as Raman spectroscopy, or electronic imaging.

SUMMARY OF THE INVENTION

In one embodiment of the present invention, an attachment, or quantum efficiency (QE) enhancement device, for an intensified charge-coupled device (ICCD) is provided. The attachment comprises an optical component that, when arranged in an optical path of light incident on the ICCD, enables individual light rays to be incident on a photocathode within the ICCD at an increased angle of incidence resulting in an increased or total internal reflection of the light rays at an intersection between the photocathode and a vacuum region of the ICCD.

The QE enhancement device may comprise re-imaging optics, a tilt compensator and an optical coupler.

Increasing the angle of incidence increases an absorbing optical path in the photocathode, without decreasing the number of generated photoelectrons that can escape from the photocathode and be amplified, thereby increasing its quantum efficiency. In applications where there is a limited amount of light to be analyzed, the more reactive the photocathode is to input light, the more sensitive the ICCD can be, and the more accurate analysis results can be.

In a practical application, the attachment (or quantum efficiency enhancement device) is used in a spectrographic apparatus. In a particular implementation, a spectrograph outputs light of different wavelengths that is dispersed in a horizontal direction so that the number of photons versus wavelength can be recorded with the ICCD as an optical spectrum. In one embodiment, the ICCD is tilted along a direction in which pixel columns of the ICCD extend such that a plane of incidence of incoming light to the ICCD is perpendicular to a direction of wavelength dispersion. The signal from each pixel in a vertical column is summed. In this way, no loss of resolution is experienced because the incident light rays stay in the same vertical column of pixels and are still analyzed together.

Embodiments of the present invention also enable, in one aspect, a method of performing spectrographic analysis that includes collecting light with a telescope, passing light collected with the telescope to a spectrograph and generating therein a plurality of spatially dispersed horizontal bands of light, causing the plurality of spatially dispersed horizontal bands of light to be incident on a photocathode of an intensified charge-coupled device (ICCD), and modifying an angle of incidence with which the plurality of spatially dispersed horizontal bands of light fall on the photocathode of the ICCD and thereby increase a quantum efficiency of the photocathode as compared to a quantum efficiency of the photocathode without modifying the angle of incidence of light incident thereon.

These and other features of the present invention, along with their attendant advantages, will be more fully appreciated upon a reading of the following detailed description in conjunction with the associated drawings.

DETAILED DESCRIPTION

The description below is provided in the context of an intensified charge coupled device (ICCD) that may be used in connection with Raman spectroscopy. However, those skilled in the art will appreciate that embodiments of the instant invention may be applied to any array detector including CMOS and CCD detectors, that use an intensifier tube (sometimes called a multichannel plate (MCP)), provided the intensifier has a photocathode.

Figure 1:
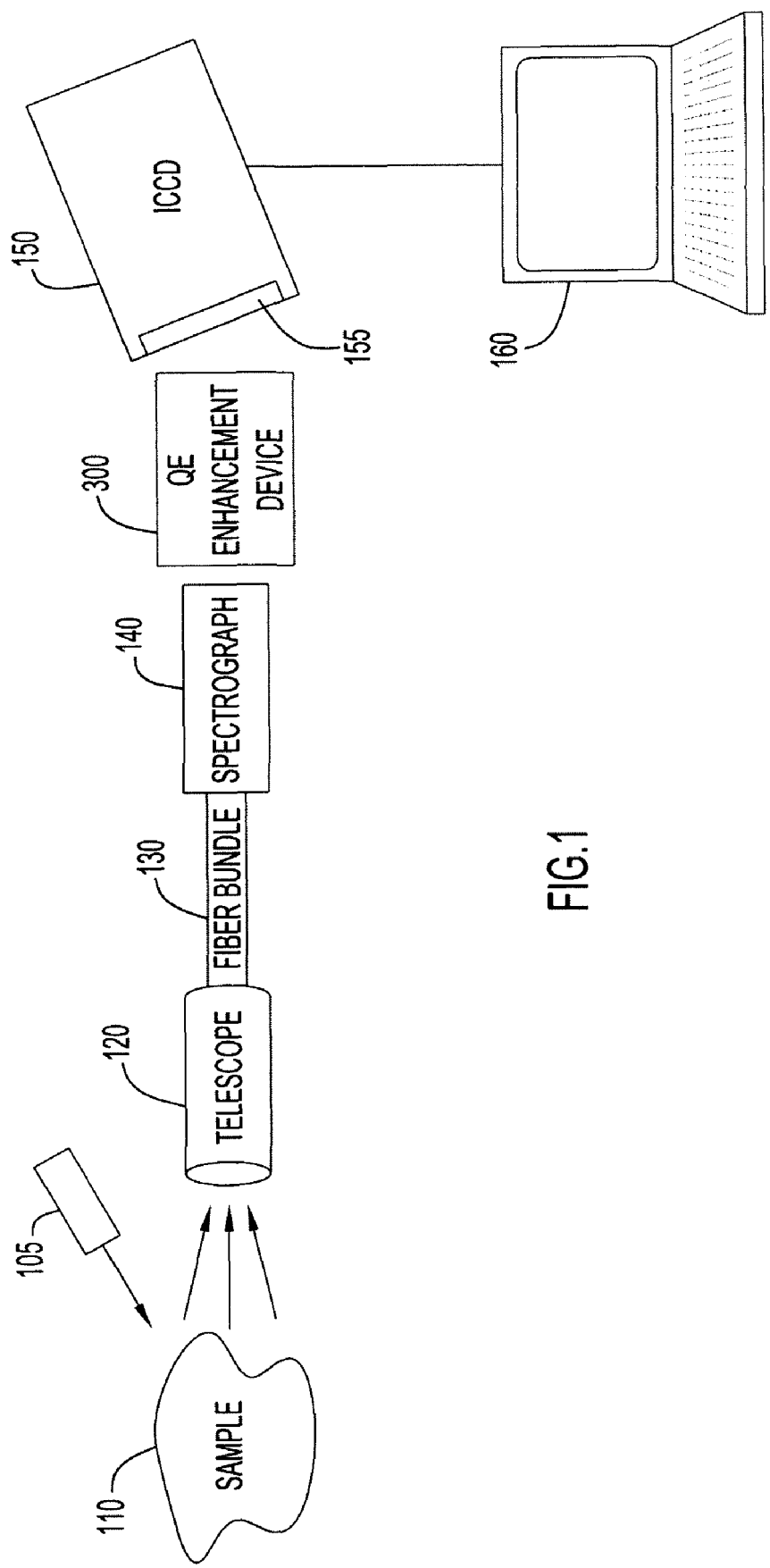
FIG. 1 is a diagram of a Raman spectroscopy system and quantum efficiency enhancement device in accordance with an embodiment of the present invention.

FIG. 1 is a diagram of a Raman spectroscopy system in accordance with an embodiment of the present invention. A telescope 120 collects spectra that are generated as a result of a sample 110 being illuminated by laser 105. Laser 105 may be arranged collinearly with telescope 120, or be off-axis, as shown in FIG. 1. The spectra or light gathered by the telescope is focused onto a fiber bundle 130 that is arranged in a circular fashion, as shown on the left hand side of FIG. 2, to match a spot of light created by the telescope 120. The individual fibers of the fiber bundle are in communication with a spectrograph 140, which causes the received light to be dispersed according to wavelength. The resulting dispersed light is sent toward an intensified charge-coupled device (ICCD) 150 (e.g., a camera) that captures a "picture" or image of the dispersed light. In one embodiment, the pictures or images are saved in a computer system 160 for subsequent analysis and pattern matching to known spectra saved in a library.

As depicted in FIG. 1, ICCD 150 may be tilted with respect to an axis normal to the incoming light and thereby increase the angle of incidence with which light strikes a photocathode 155 of the ICCD 150. Also, in accordance with an embodiment of the present invention, a quantum efficiency (QE) enhancement device 300 is disposed between the spectrograph 140 and the ICCD 150. Details of the QE enhancement device 300 and reasons for tilting the ICCD 150, or tilting light rays incident upon the ICCD 150 are provided below.

Figure 2:
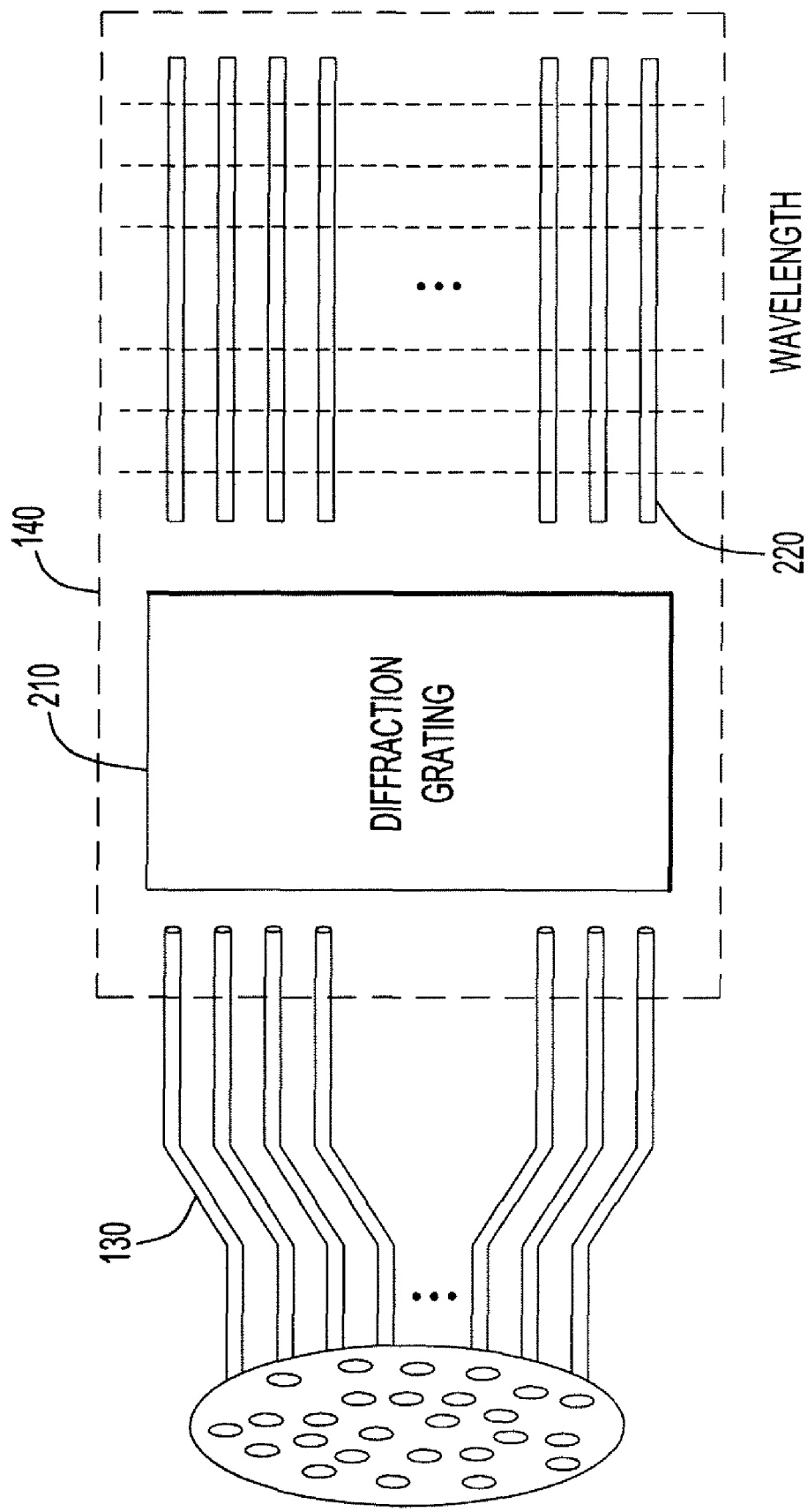
FIG. 2 depicts how a diffraction grating within a spectrograph generates bands of light corresponding to respective optical fibers that may be used in connection with embodiments of the present invention.

FIG. 2 depicts how a diffraction grating 210 within spectrograph 140 generates bands of light corresponding to respective optical fibers from the fiber bundle 130 that may be used in connection with embodiments of the present invention. More specifically, the fibers from fiber bundle 130 are "fanned out" in a vertical direction to make a linear array of individual fibers. The light from this linear array is then caused to pass through the diffraction grating 210. Consequently, the light from each fiber is transformed into spatially dispersed horizontally disposed spectra 220. Each of the resulting spectra is provided to the ICCD 150. Other optics used in a spectrograph are not shown for clarity.

More specifically, the light of different wavelengths is spatially dispersed in a horizontal direction so that the number of photons vs. wavelength can be recorded on the ICCD 150 as an optical spectrum. To maximize signal, the ICCD response is often fully vertically binned (FVB) along a single column of pixels in the vertical direction of its internal rectangular array detector. (A typical array has 256 horizontal rows and 1024 vertical columns of pixels). In other words, the spatially dispersed light from each fanned out fiber can be analyzed along each vertical set, or column(s), of pixels, where each column of pixels corresponds to different wavelength of light (or a relatively small bandwidth thereof).

Figure 3A:
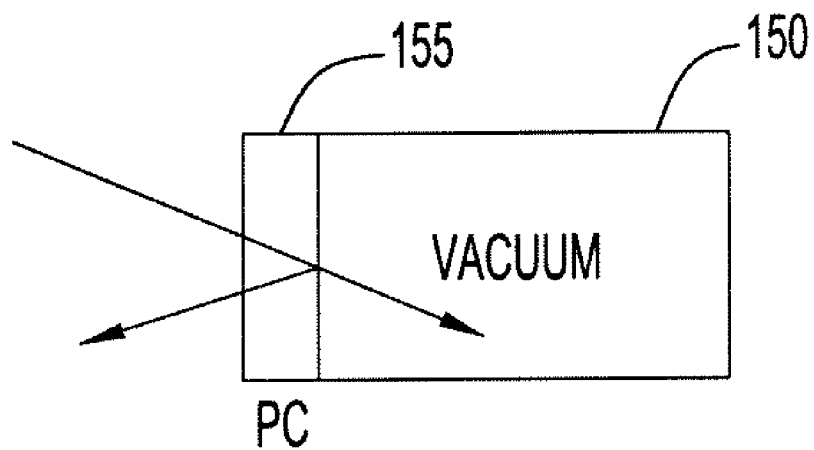
FIG. 3A shows an instance where total internal reflection at the photocathode-ICCD vacuum boundary does not occur.

A major limitation of commercial intensified array detectors such as cameras and ICCD devices is the quantum efficiency (QE) of commercially available photocathodes (PCs), which in the ultraviolet (UV) spectrum (particularly relevant to Raman spectroscopy) may only be 20-30%. More specifically, the photocathode is deposited onto the inside of the front face or glass window of an intensifier tube (See, e.g., FIGS. 1 and 3A). Light enters the glass from the outside air and then into the photocathode. The quantum efficiency is the fraction of incident photons that are converted by the photocathode into measurable photo-electrons. In the normal application, at low angles of incidence, the path length in the photocathode is short and most of the light passes out the other side of the photocathode and is wasted (FIG. 3A).

The major reason for this low QE is that the thickness of the PC 155 must be large (or thick) enough to absorb as many photons as possible, but small (or thin) enough to allow the generated photoelectrons to escape (and be amplified by the microchannel plate in the ICCD). Manufacturers choose a PC thickness to obtain maximum QE by balancing these two effects. Similar compromise design considerations are made in connection with other imaging and intensified array detectors.

Chyba and Mandel (JOSA B 5, 1305-1311 (1988)) demonstrated that the QE of a PC for a vacuum photodiode can be increased by as much as a factor of four when auxiliary optics (or an antireflection coating) is used to bring the light into the PC at an angle high enough to cause total internal reflection at the PC-vacuum interface inside the tube (~60 degrees depending on the glass and PC materials). For transverse electric (TE) polarized light, enhancement occurs at much lower angles, though for transverse magnetic (TM) polarized light, the generated signal decreases since the reflected wave in the PC is reduced as the internal angle of incidence approaches Brewster's angle but increases again above it. While this qualitative behavior holds for the PCs in ICCDs considered here, the optical constants of the materials involved are different for a UV application, as is the overall component arrangement for, e.g., spectrographic applications. Consequently, it is not in any way predictable or expected that the aforementioned research can be successfully applied to the specific spectrographic applications described herein.

Figure 3B:
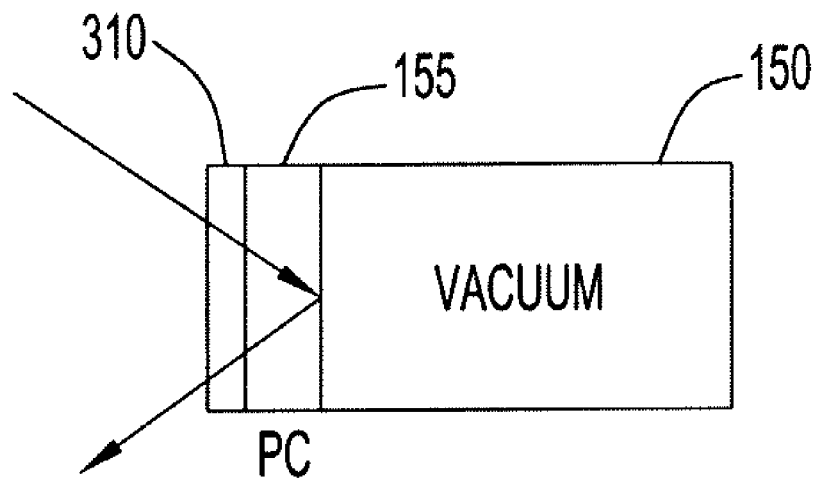
FIG. 3B shows an instance where total internal reflection at the photocathode-ICCD vacuum boundary occurs, along with an anti-reflection coating on a face of the intensified array.

In embodiments described herein, a QE enhancement device 300 is provided for contacting the front window of an intensifier tube to allow rays to enter the photocathode at very high angles of incidence. A function of the QE enhancement device is to compensate for the air to glass interface. At the air to glass, there is a high mismatch in optical index. This large mismatch leads to high reflection coefficients going from air to glass. One of the features of embodiments of the invention is to avoid this high reflection by preventing the mismatch at the air-glass interface. This may be accomplished using an AR coating 310, as shown in FIG. 3B, or solid optics that touch the glass window (the air-glass surface of these solid optics is also typically antireflection coated).

The reason for the high angle of incidence is two-fold. First, as the incidence angle grows, so does the absorption path length in the PC 155 without any increase in escape path length of the photoelectron generated by the absorption of the photon. This gives rise to increased QE.

Second, as the incidence angle grows, so does the amount of light reflected at the PC-vacuum interface (due to the laws of optics) until finally all light is reflected for any angle of incidence higher than the critical angle. Above this angle, all photons entering the photocathode have a chance of absorption both to and from the PC-vacuum boundary. This further increases QE. The critical angle for total internal reflection depends on the material of the PC 155.

In accordance with embodiments of the present invention, to increase the quantum efficiency of the ICCD's photocathode 155, the focal plane of the ICCD 150 is tilted (or effectively optically tilted), thereby increasing the angle of incidence with which the light strikes the ICCD thereby increasing the likelihood of total internal reflection of the light within the PC 155. To illustrate again, FIG. 3A shows light incident upon a photocathode 155 of an ICCD 150 wherein total internal reflection does not occur. This is indicated by the light ray passing through the PC 155. FIG. 3B, on the other hand, shows a light ray that strikes the PC 155 at a higher angle of incidence, resulting in total internal reflection at the PC-ICCD vacuum interface. When such total internal reflection occurs, an increased photocathode effect results, thereby causing an increase in quantum efficiency of the photocathode 155.

In the context of spectrographic or imaging applications, however, there may be issues with tilting the ICCD as shown in FIG. 1 to achieve the increased angle of incidence, and thus increased QE for the photocathode. Those skilled in the art will appreciate that tilting (or effective tilting) may be with respect to the ICCD's vertical or horizontal axis when looking at the face of the ICCD 150.

First, high angles of incidence inside the PC 155 leads to the light being "smeared" along one direction (which is the plane containing the incident and reflected rays, called the plane of incidence, which is taken as the vertical plane), which could cause loss of image resolution along that direction. This problem is addressed by embodiments of the present invention by (1) making the plane of incidence lie along the direction of vertical bins (appropriate for applications where the spectrum is vertically binned, but if a true pixel-by pixel picture is needed, binning cannot be used). In other words, this tilting technique can be employed for ICCDs in this application provided that the required tilt angle of the incident light is along the direction of the vertical bins or pixel columns of the ICCD 150 such that the plane of incidence of the incoming light is perpendicular to the direction of the wavelength dispersion.

The aforementioned issue is also addressed by (2) recognizing that most PCs are thin relative to the size of the imaging element (pixel). Typical photocathodes are very thin (~0.01 to ~0.5 microns), but pixels in a detector are ~2-100 microns, so the angles of incidence must become exceedingly large for appreciable smearing to occur. Hence, no vertical binning is needed in cases where the PC is thin enough or the size of the pixels is large enough, or the required resolution of the spectrograph or camera does not require single pixel resolution.

Figure 4:
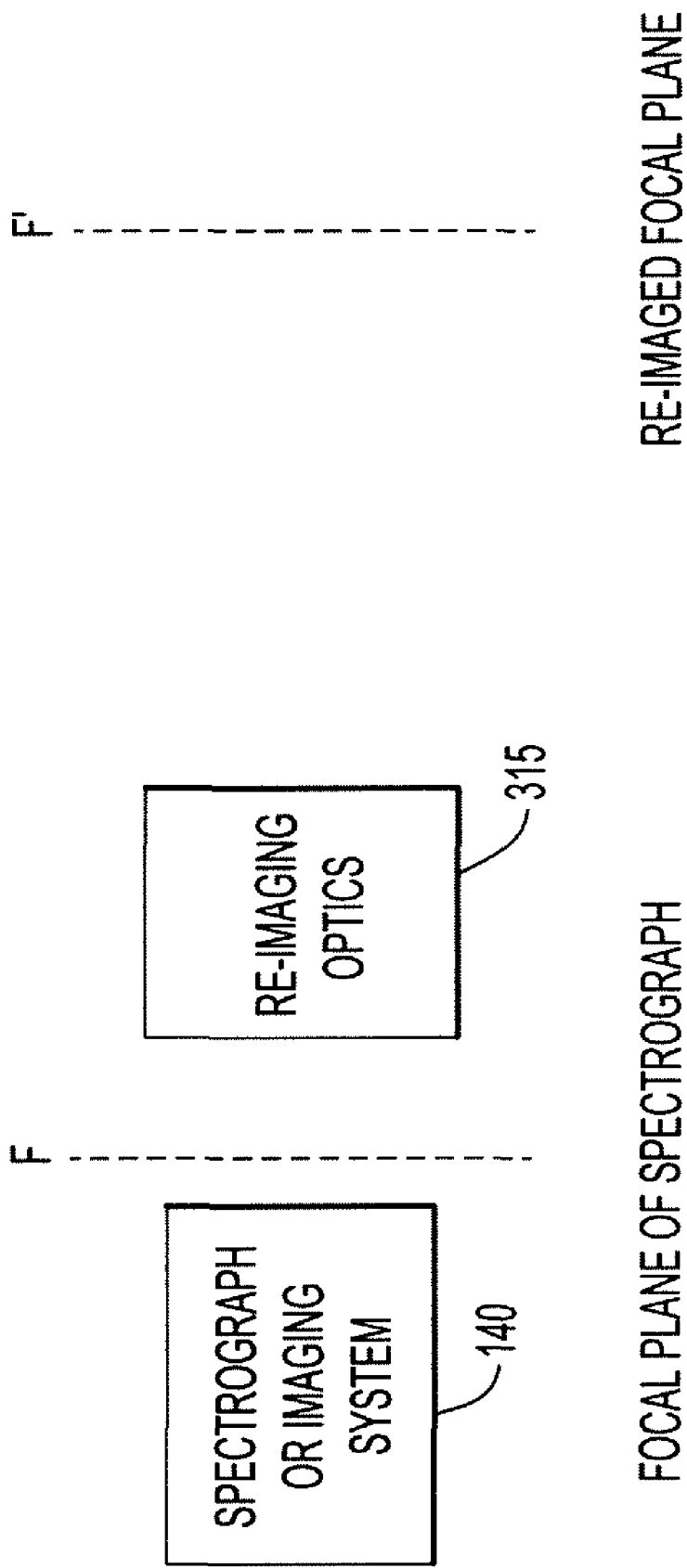
FIG. 4 depicts the use of re-imaging optics in connection with embodiments of the present invention.

Second, for proper imaging, the focal plane of the camera or spectrograph must be coplanar with the photocathode. This is the more critical problem. The need to tilt the intensified detector along with the coupling optics required to allow the light to enter the intensifier PC at a high angle of incidence, makes this appear impractical. This problem is addressed by embodiments of the present invention by allowing for the use of optional re-imaging optics 315 in the QE enhancement device 300 to move the focal plane far enough away from the output port of the spectrograph to allow placement of tilt-compensation and coupling optics in front of the intensified array detector (as shown in FIG. 4). More specifically, FIG. 4 shows re-imaging optics 315 allow room for the placement of the coupling optics in front of the intensified array detector, whose PC 155 must line along F'. In unenhanced or normal operation, the PC lies along F.

Figure 5:
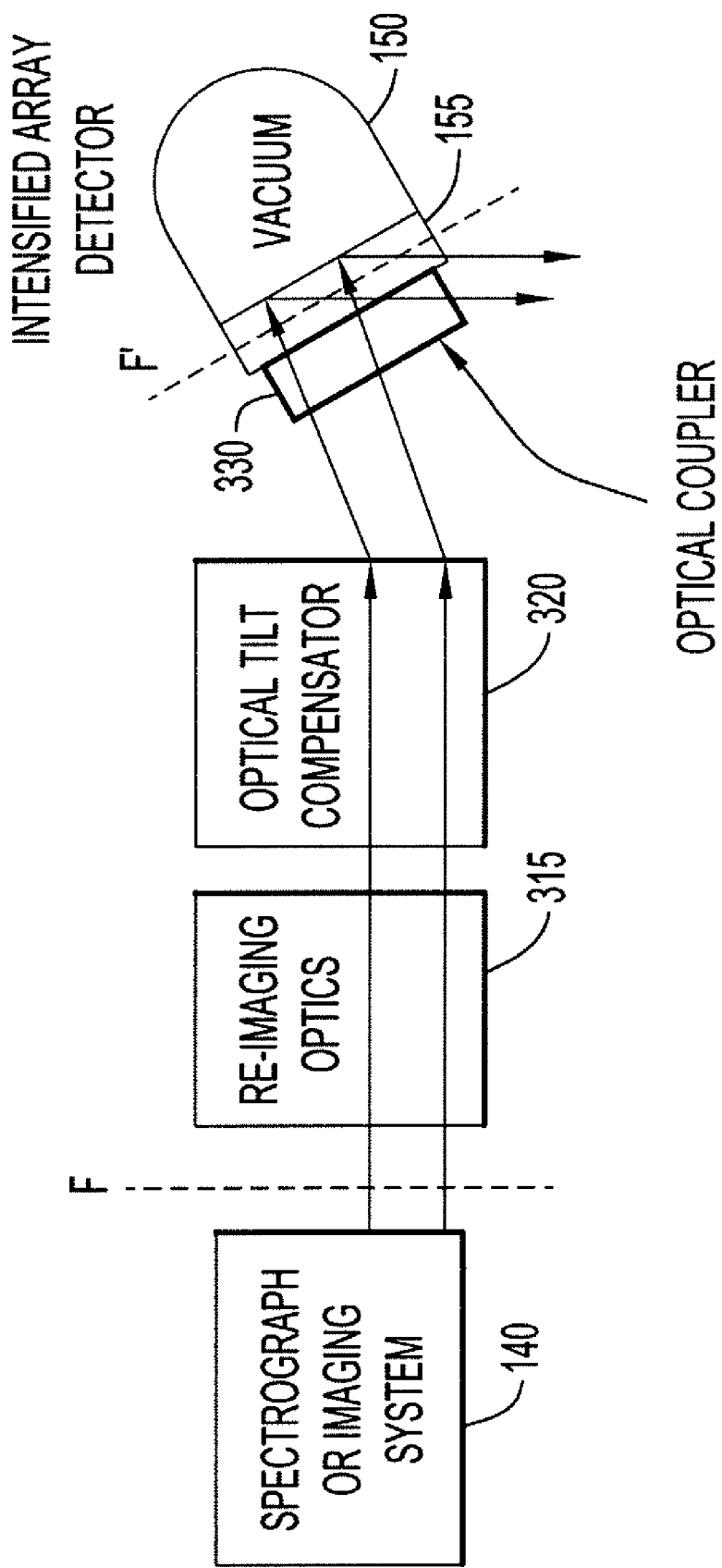
FIG. 5 shows the use of re-imaging optics, an optical tilt compensator and optical coupler in accordance with embodiments of the present invention.

Three functions that embodiments of the present invention may perform are illustrated in FIG. 5. Optional re-imaging optics 315 may be provided to re-image the focal plane from F to F'. Tilt compensation optics 320 are provided as part of the QE enhancement device 300 to ensure the original focal plane of the spectrograph is properly re-imaged onto the tilted photocathode 155. And an optical coupler 330 may be employed to couple light into the intensifier tube at the high angles of incidence required to increase the quantum efficiency. Other component arrangements to achieve this functionality are shown in FIGS. 6-9. In these figures, the optical path that each of two rays takes from the original focal plane F of the spectrograph 140 to the re-imaged focal plane F' is the same even though the PC 155 has been tilted and coupling optics (or coating) 330 provided to allow light to enter the PC at the desired high angle of incidence has been added.

Tilting the ICCD 150 (even when below the critical angle for total internal reflection for the case of TE waves) increases the optical (absorbing) path length for the light in the PC 155 without increasing the path for the photoelectrons to escape. No loss of resolution occurs because the incident and reflected light rays always stay in the same vertical column, or bin, of pixels and the signal from each pixel in that column continues to be binned together.

Figure 6:
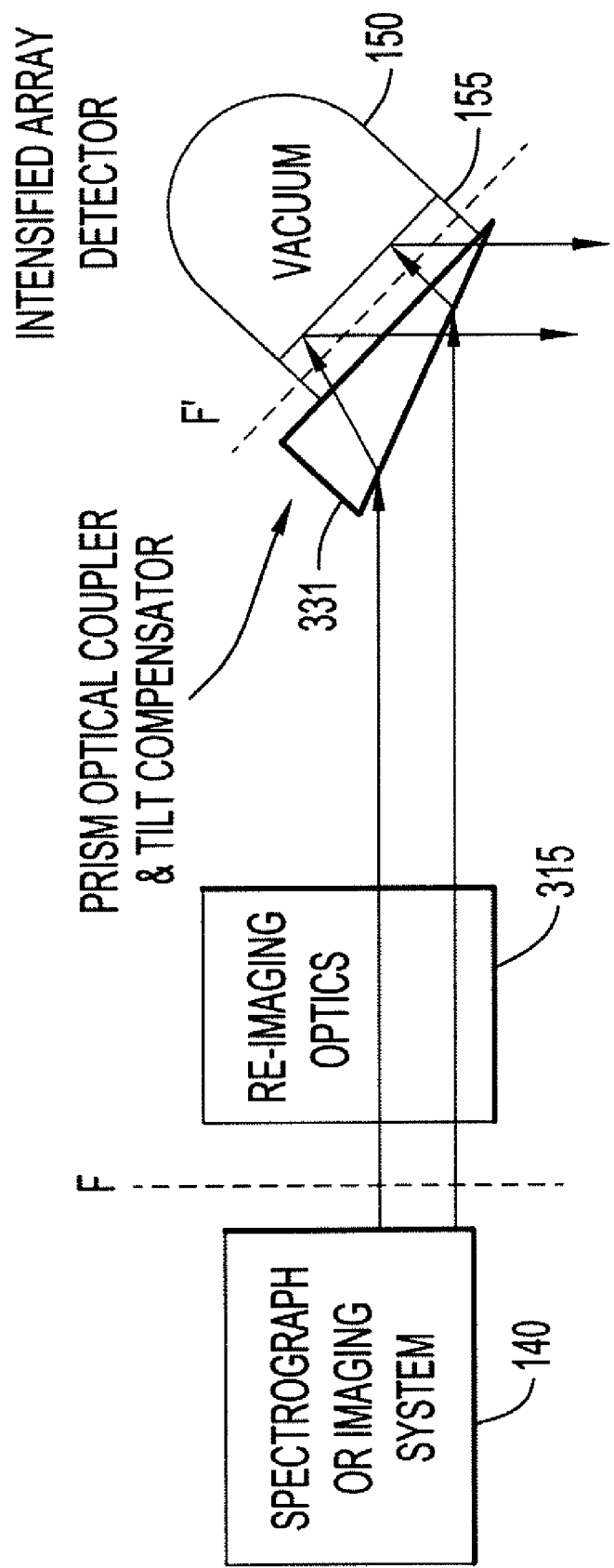
FIG. 6 shows a combined tilt compensator and optical coupler in accordance with embodiments of the present invention.

In FIG. 6, the focal plane of the spectrograph 140 is re-imaged to F'. The prism 331 (preferably with AR coating at entrance face) serves two functions: (1) optical coupler: it enables rays to enter the PC at high angles of incidence and (2) tilt compensator: it is designed to provide additional optical delay for rays that strike the top of the PC 155, so that the optical path to F' for the upper ray and the lower ray is preserved, thereby enabling the image plane F' to be coplanar with the PC 155. (The optical path in geometrical thickness T of glass is greater than the optical path in the same geometrical thickness T of air, so the short geometric path in glass for the top ray compensates for the longer geometrical path that the bottom ray has in air to the PC 155.)

The amount that a prism bends light in general depends upon the wavelength. In a spectroscopic application, the wavelength of light varies across the array detector (this direction is perpendicular to the plane of the page). To compensate for this, the apex angle of the prism can be made to vary slightly across the face of the intensifier. Aberrations in the image can also be induced by the wedge, but can be compensated (at least in part) for by design [Barth and Oepts, 1988] or by the use of additional optics.

Figure 7:
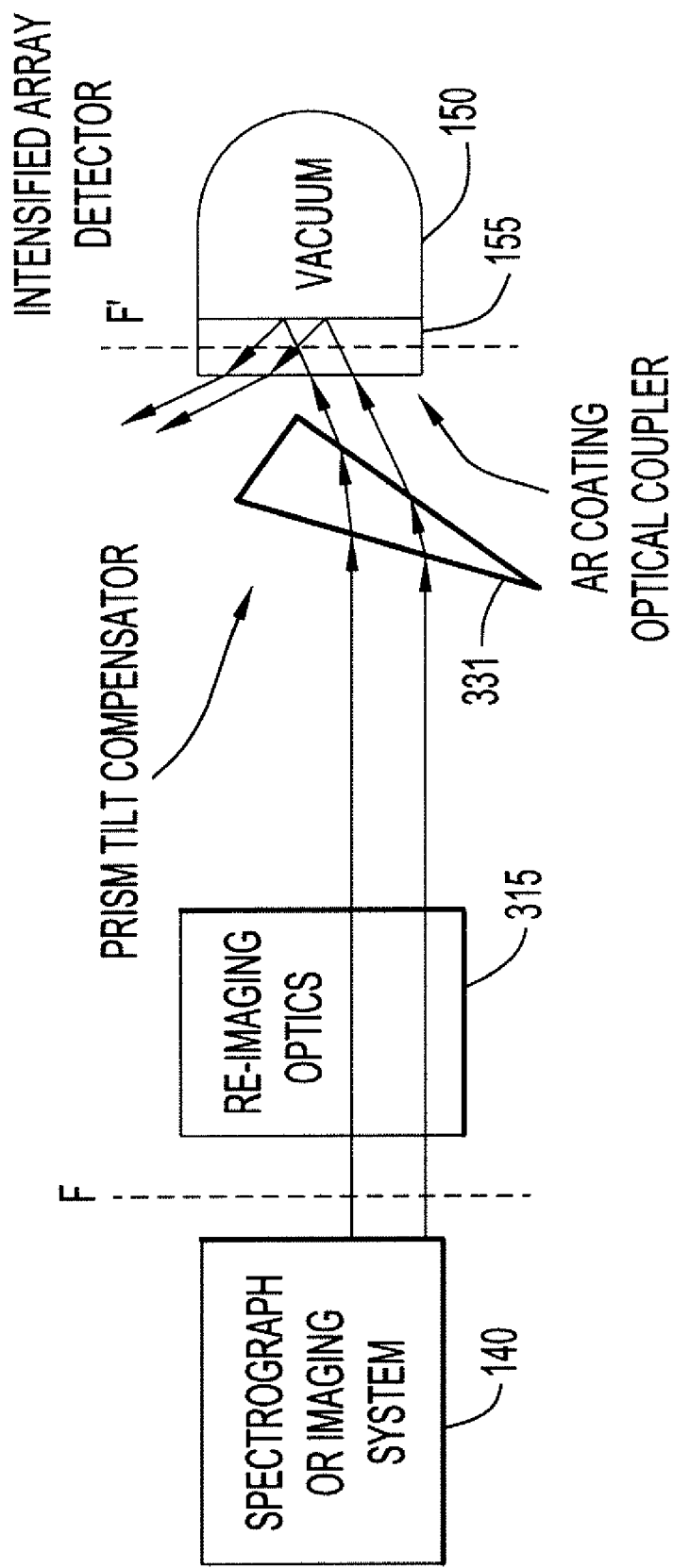
FIG. 7 shows an embodiment in which the tilt compensator and optical coupler are separated from each other.

In FIG. 7, the focal plane F of the spectrograph is re-imaged to F'. The prism 331 (preferably with AR coating at entrance face) acts as the tilt compensator. In this case, The AR coating on the intensifier window acts as the optical coupler. A computer raytrace application was used to verify that it is possible for a prism made of common materials, of small size, and having a small apex angle, to create a fairly large (23.5 degree) angle between the image plane and the direction of the incoming rays. In one possible implementation, as shown, the PC 155 is aligned to the image plane F'.

Figure 8:
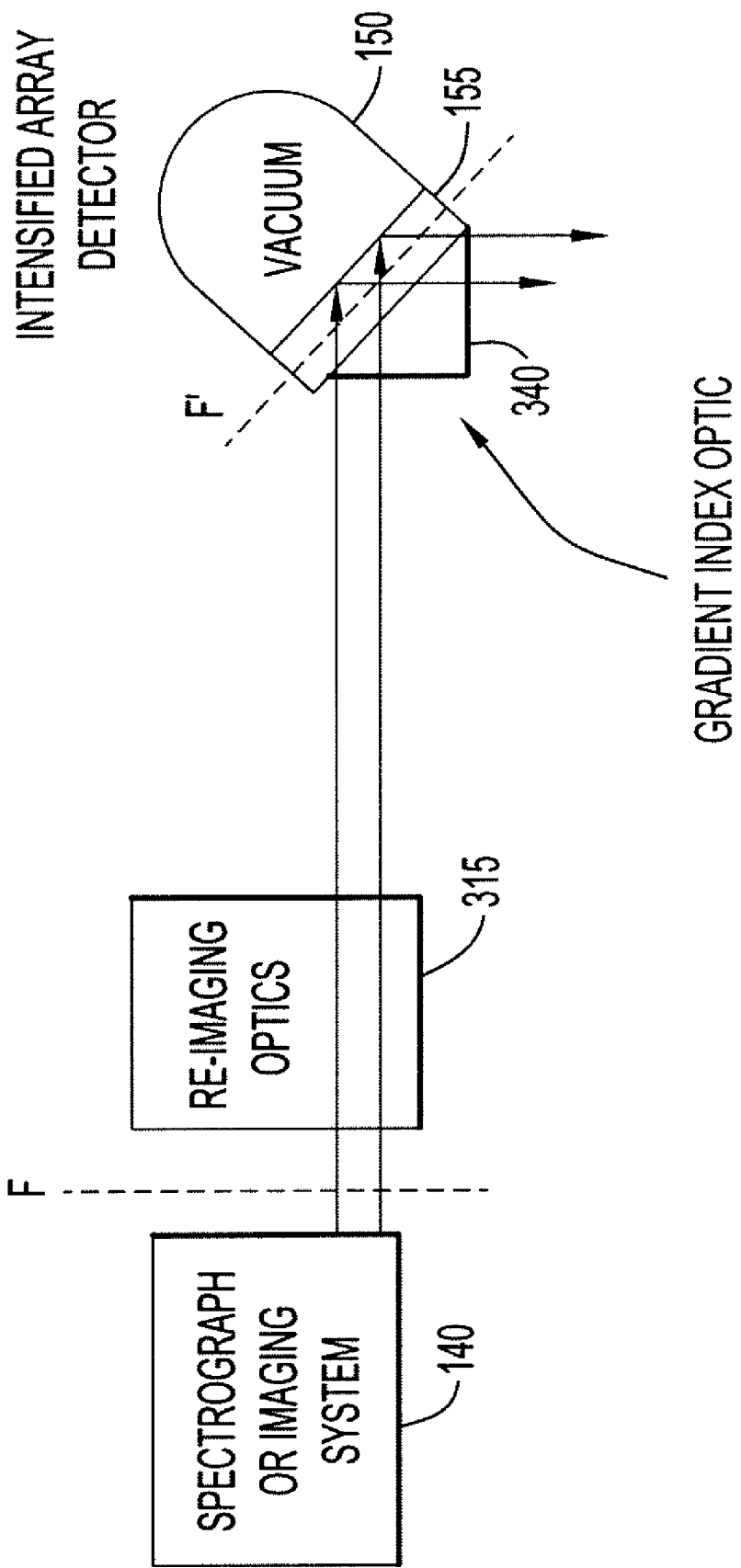
FIG. 8 depicts the use of a gradient index optic in accordance with an embodiment of the present invention.

In FIG. 8, the focal plane F of the spectrograph is re-imaged to F'. The image plane is rotated by a gradient index optic 340 which serves as an optical coupler and as a tilt compensator. The gradient index optic 340 has an optical index that increases linearly along the tipped face of the intensified array detector, so that the optical paths of both rays to F' are identical. For clarity, refractive effects at non-perpendicular optical interfaces are not shown.

Figure 9:
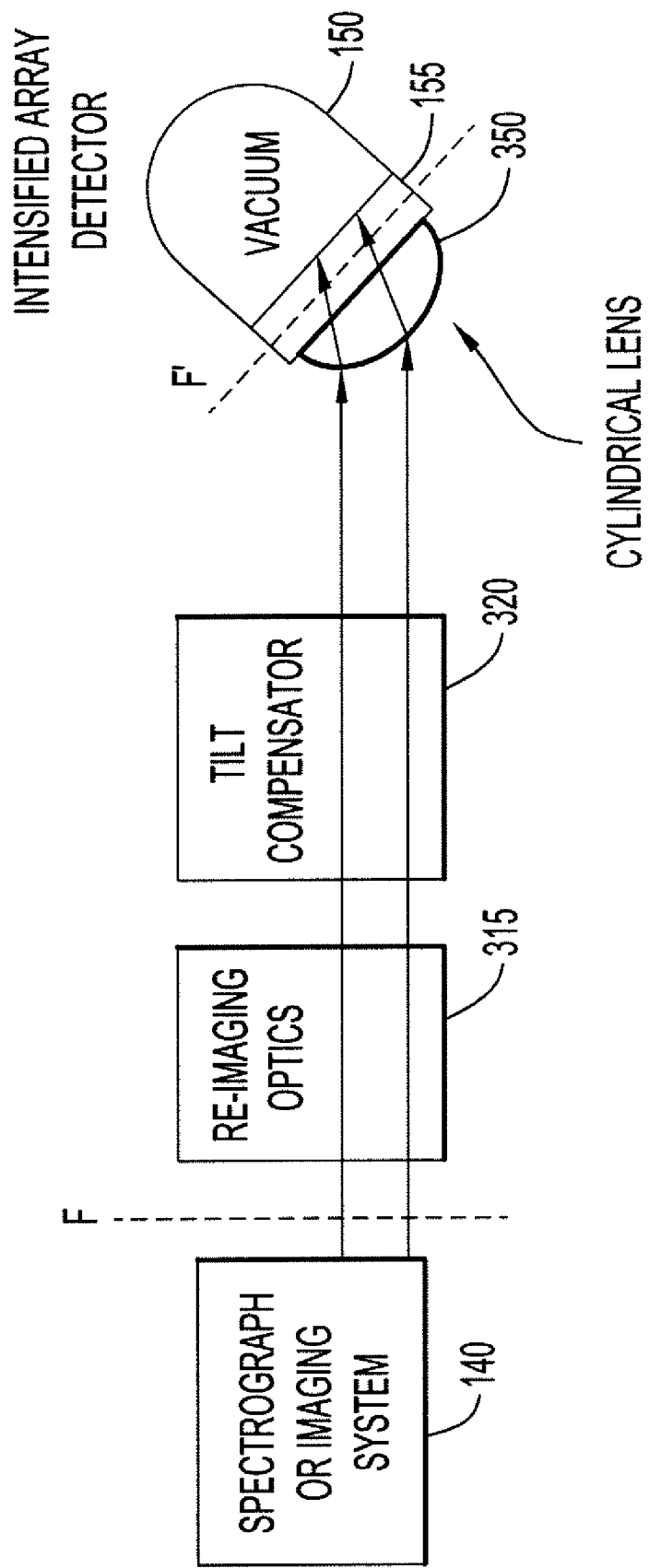
FIG. 9 depicts the use of a cylindrical lens in accordance with an embodiment of the present invention.

FIG. 9 show the use of a cylindrical lens 350. The focal plane F of the spectrograph is re-imaged to F'. The cylindrical lens 350 serves the function of optical coupling and partial tilt compensation. The focusing power of the lens 350 reduces the magnification of the image along the F' direction. While this will reduce the need for tilt compensation by compressing the extent of the image along the tilted direction, additional tilt compensation may still be needed for proper focusing.

Thus, quantum efficiency enhancement device 300 can take one of several forms. As noted, an objective of the overall arrangement of (tilted) ICCD 150 and QE enhancement device 300 is to enhance the QE of the photocathode 155 by increasing the absorbing optical path in the PC 155 without loss of spectral resolution by preserving the same optical path length to the focal plane for all light rays in the vertical direction. Rays can have different geometrical path lengths to the focal plane, but they must have the same optical path length to be brought to proper focus.

Figure 10A:
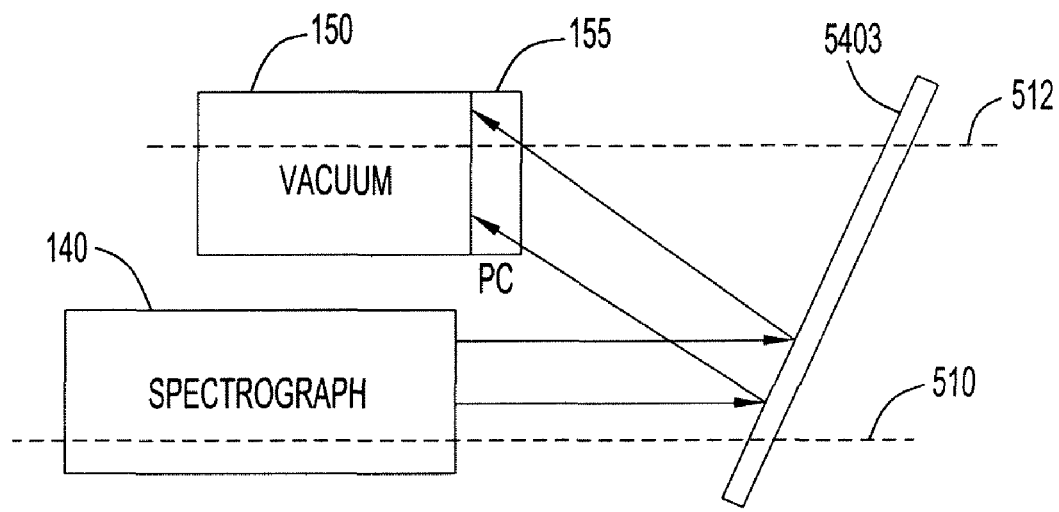
FIGS. 10A and 10B show alternative embodiments in accordance with the present invention.
Figure 10B:
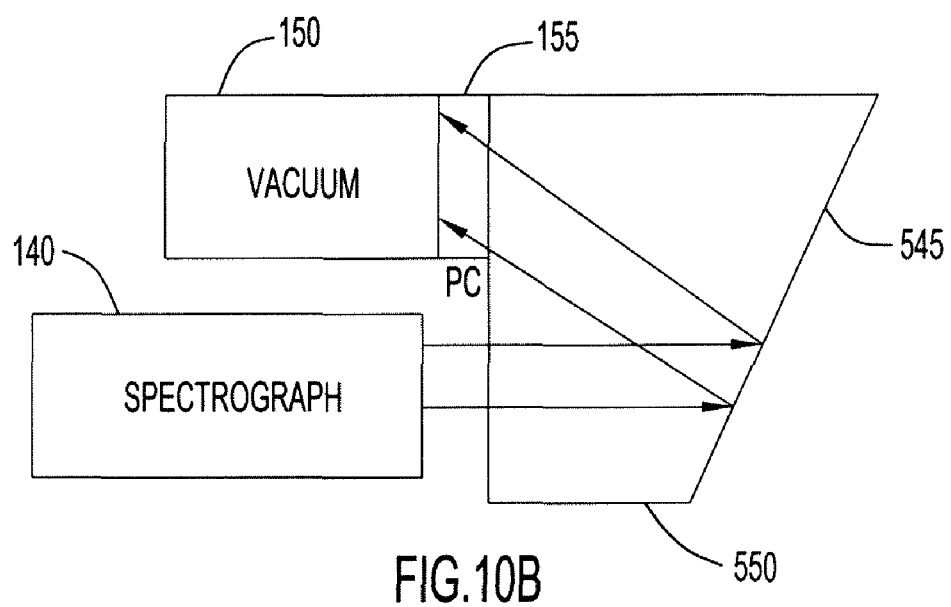

In yet another embodiment, FIG. 10A shows an alternative embodiment, in which the arrangement of the components shown in FIG. 1 is changed slightly. Here, an auxiliary mirror 340 is used to image the focal plane of the spectrograph 150 in a manner to make it coincide with the plane of the tilted PC 155. Re-imaging and tilt compensation optics (not shown) may also be needed. In a preferred embodiment, the ICCD 150 has an AR coating on its front face/window to couple in the light. With this arrangement, the ICCD 150 is oriented along an axis 512 that is different from an axis 510 along which the spectrograph 140 is arranged. While such an arrangement may take up more room in one direction, it may be simpler to adjust a single mirror 540 at the appropriate distance and tilt angle than to adjust distance/tilt of the more bulky ICCD camera itself FIG. 10B depicts still another embodiment. Here, instead of a separate mirror 540, the reflection function is performed by a back reflecting facet 545 of a solid optic 550 which fills the space so as to index match to the front face of the ICCD 150, eliminating the need for an AR coating at that surface to couple in light at high angles. On the other hand, an AR coating may be desirable at the front face of the solid optic 550. Re-imaging and tilt compensation optics (not shown) may also be needed.

Figure 11:
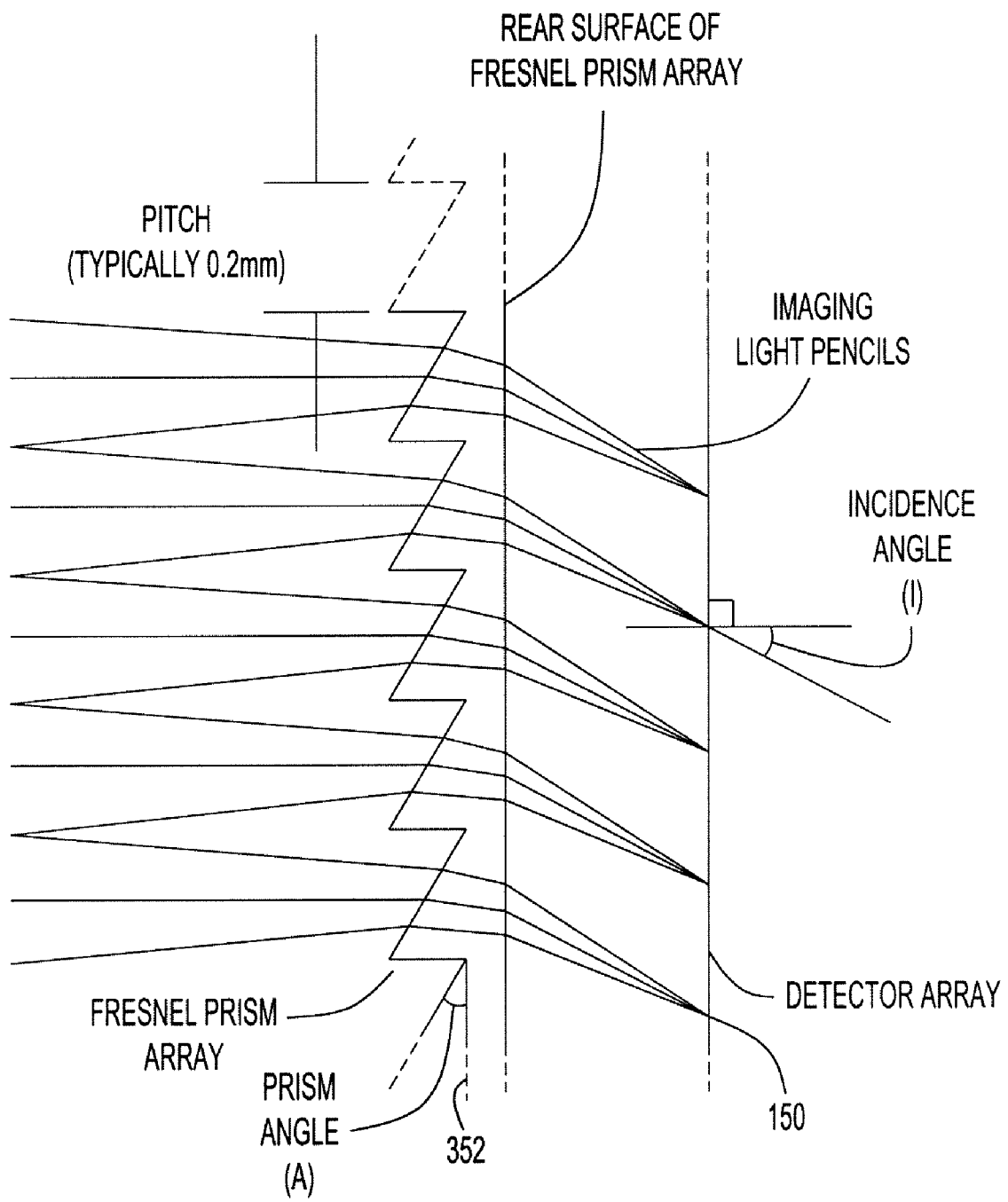
FIG. 11 shows the use of a Fresnel prism array as part of an optical tilt compensator in accordance with an embodiment of the present invention.

FIG. 11B shows the use of a Fresnel prism array as part of the optical tilt compensator 320 in accordance with an embodiment of the present invention. More specifically, rather than using a conventional prism (like prism 331 in shown in FIG. 6) to bend the light as has been described previously, the present invention can instead make use of a Fresnel prism array 352 to bend the light, as shown in FIG. 11. The benefit of using the Fresnel prism array 352, is that it can effect the same amount of bending as a standard prism yet, if the Fresnel prism facet size is made small enough and the Fresnel array thin enough, aberrations introduced by the Fresnel prism array can be significantly less—typically by a factor 100x—than those introduced by a standard prism.

By using a Fresnel prism array to achieve an optimum beam incidence angle at the face of the detector 150, the signal delivered by the detector for the same amount of incident light may increase by a factor of 2x (or more) while the same image quality can be maintained as would have been achieved had no prism device been used at all.

The amount by which a light ray is bent (or deviated) by a prism depends on the refractive index of the prism substrate, n, the prism angle, A, and the initial angle at which the ray is incident on the prism. An image forming device such as a lens or telescope produces conical image-forming light pencils made up of a certain range of ray angles. In general, the spread of angles of a light rays in the conical pencil is magnified after the light pencil emerges from the prism. This can create a serious problem whereby the spread of angles on the rays arriving at the detector may now grossly exceed the angular range over which detector quantum efficiency is maximized.

To minimize the angular spread of the rays, it is known that the prism needs to be oriented with respect to the incoming rays so as to fulfill "minimum deviation" condition. Minimum deviation can always be achieved by appropriately tilting the prism. However, in general, when minimum deviation is established, both prism faces are tilted at arbitrary angles with respect to both the incident light and the detector. Thus, a another aspect of this embodiment is that, by suitable choice of the refractive index of the Fresnel prism substrate, the minimum deviation condition can be fulfilled while also making the rear surface of the Fresnel prism parallel to the detector surface—as shown in FIG. 11.

Mathematically, this special case of minimum deviation is achieved when the refractive index of the Fresnel prism substrate, n, is calculated as follows:

$$n = \frac{\sin(I)}{\sin\left(\frac{I}{2}\right)}, \quad (1)$$

where I is the desired angle of incidence on to the detector 150.

Figure 12:
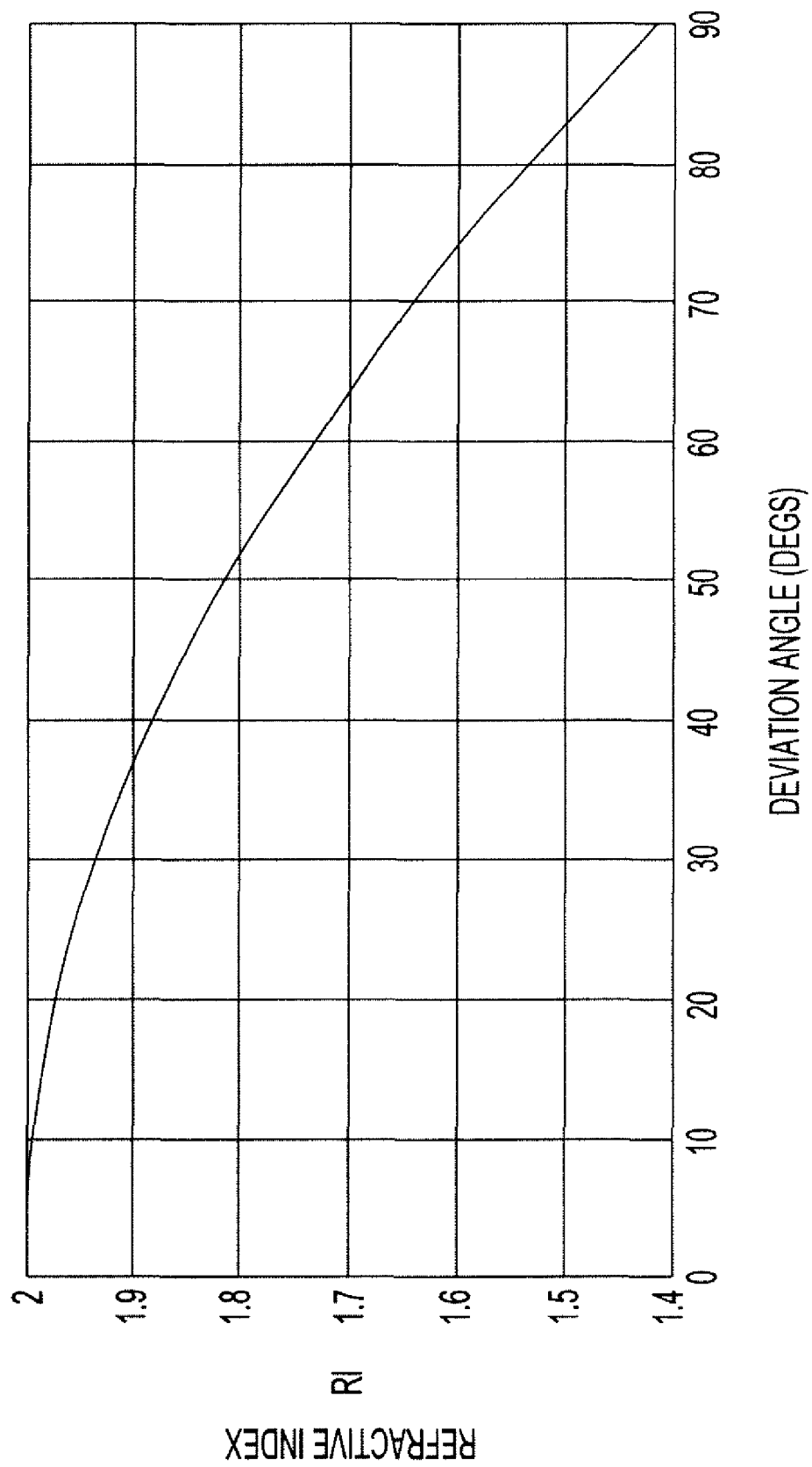
FIG. 12 shows how the refractive index varies with beam incidence angle.

FIG. 12 shows how the refractive index varies with beam incidence angle as described by Equation 1. According to FIG. 12, the refractive index, n, lies in the range $\sqrt{2} \leq n \leq 2$. Fortunately, this range is extremely well represented by the wide family of optical glasses and clear plastics that are commercially available. In practice, therefore, it should always be possible to have a flat rear surface of the Fresnel prism array 352 while adhering to the minimum deviation condition where the light arriving at the detector 150 all arrives within a minimum of spread from the angle of incidence that gives maximum detector QE.

For better clarity, FIG. 11 shows a space between the rear, flat surface of the Fresnel prism array 352 and the detector 150. In practice, it would not be desirable to have the large space shown; highest image quality is maintained if the space is made as small as possible. Often, the space should be shrunk to zero by placing the Fresnel array rear surface in contact with the detector 150.

Thus, the quantum efficiency enhancement device, especially when used in connection with spectrographic applications, increases the efficiency of an ICCD, thereby increasing the sensitivity of the overall spectrographic system. By tilting the ICCD at an appropriate angle (and appropriate direction to maintain vertical binning), light from a spectrograph strikes the photocathode of the ICCD at a higher angle of incidence. Typically, depending on the angle, an increased number of light rays will thus experience total internal reflection at the barrier between the photocathode and an evacuated region of the ICCD. This increased total internal reflection causes the quantum efficiency of the photocathode to increase.

In an embodiment, the quantum efficiency enhancement device can be made available as an add-on to existing ICCD equipment. However, to ensure that the QE enhancement device is aligned properly and attached without dirt or contamination between the window of the ICCD and the QE enhancement device, it may be desirable to have an ICCD manufacturer include the QE enhancement device as an option, and "marry" or integrate the two devices (ICCD and QE enhancement device) within a clean room environment.

As possible connection alternatives, the QE enhancement device may be bolted, screwed or otherwise fastened to the face of the ICCD. Of course, AR and index matching coatings, or adhesives where used, can be applied in the conventional manner.

In sum, embodiments of the present invention enable an increase in the angle of incidence at the glass-photocathode boundary, resulting in an increased angle inside the PC, thereby increasing the path length inside the PC. As critical angle for total internal reflection is approached, fewer rays pass out the back of the photocathode and more are reflected back into it. Consequently, the number of rays also increases with angle due to this effect. Once the critical angle for total internal reflection is reached, and for angles larger than it, all rays are reflected back into the PC from the PC-vacuum boundary.

The systems and methods described herein may be embodied in other specific forms without departing from the spirit or essential characteristics thereof. The foregoing embodiments are therefore to be considered in all respects illustrative and not meant to be limiting.

What is claimed is:

1. A method of performing spectrographic analysis, comprising:
   collecting light with a telescope;
   passing the light collected with the telescope to a spectrograph and generating therein a plurality of spatially dispersed horizontal bands of light;
   causing the plurality of spatially dispersed horizontal bands of light to be incident on a photocathode of an intensified charge-coupled device (ICCD);
   controlling an angle of incidence with which the plurality of spatially dispersed horizontal bands of light fall on the photocathode of the ICCD and thereby increase a quantum efficiency of the photocathode compared to a quantum efficiency of the photocathode without having controlled the angle of incidence such that a signal delivered by the ICCD is increased by at least a factor of two compared to a signal delivered by the ICCD without having so controlled the angle of incidence; and
   controlling the angle of incidence with which the plurality of spatially dispersed horizontal bands of light fall on the photocathode of the ICCD by passing the bands of light through a Fresnel lens.

2. The method of claim 1, further comprising arranging the spectrograph along an optical axis different from an optical axis along which the ICCD is arranged.

3. The method of claim 1, further comprising tilting the ICCD along a direction in which pixel columns of the ICCD extend such that a plane of incidence of incoming light to the ICCD is perpendicular to a direction of wavelength dispersion.

4. The method of claim 1, further comprising conducting Raman spectroscopy using images based the plurality of spatially dispersed horizontal bands of light.

* * * * *